(12) United States Patent
Serbest

(10) Patent No.: US 8,493,846 B2
(45) Date of Patent: Jul. 23, 2013

(54) ROBUST MULTICAST BROADCASTING

(75) Inventor: Yetik Serbest, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 272 days.

(21) Appl. No.: 12/571,138

(22) Filed: Sep. 30, 2009

(65) Prior Publication Data

US 2011/0075572 A1   Mar. 31, 2011

(51) Int. Cl.
*H04L 12/26* (2006.01)
(52) U.S. Cl.
USPC .......................................... 370/229; 370/242
(58) Field of Classification Search
USPC ................... 370/218, 229–236, 242–248
See application file for complete search history.

(56) References Cited

U.S. PATENT DOCUMENTS

| | | | |
|---|---|---|---|
| 6,343,065 B1 | 1/2002 | Serbest et al. | |
| 7,227,838 B1 * | 6/2007 | O'Riordan | 370/219 |
| 7,248,562 B2 | 7/2007 | Serbest et al. | |
| 7,570,637 B2 | 8/2009 | Serbest et al. | |
| 7,573,875 B2 | 8/2009 | Cankaya | |
| 7,586,844 B2 | 9/2009 | Serbest et al. | |
| 7,693,171 B2 | 4/2010 | Gould | |
| 7,719,995 B2 | 5/2010 | Luft | |
| 7,768,935 B2 | 8/2010 | Ou | |
| 7,921,326 B2 | 4/2011 | Ali et al. | |
| 7,937,483 B2 | 5/2011 | Chen et al. | |
| 7,990,852 B1 * | 8/2011 | Cirkovic et al. | 370/228 |
| 2002/0064129 A1 | 5/2002 | Serbest et al. | |
| 2004/0215821 A1 * | 10/2004 | Regan et al. | 709/240 |
| 2004/0258069 A1 | 12/2004 | Serbest et al. | |
| 2006/0155828 A1 * | 7/2006 | Ikeda et al. | 709/220 |
| 2007/0083907 A1 | 4/2007 | Serbest et al. | |
| 2007/0121588 A1 | 5/2007 | Chen et al. | |
| 2007/0230340 A1 | 10/2007 | Serbest et al. | |
| 2007/0239879 A1 | 10/2007 | Serbest et al. | |
| 2008/0114648 A1 | 5/2008 | Chen et al. | |
| 2008/0205395 A1 * | 8/2008 | Boddapati et al. | 370/390 |
| 2008/0291920 A1 | 11/2008 | Serbest et al. | |
| 2009/0016361 A1 | 1/2009 | Serbest et al. | |
| 2009/0154340 A1 * | 6/2009 | Kumaresan et al. | 370/218 |
| 2009/0260046 A1 | 10/2009 | Yang | |
| 2009/0268607 A1 * | 10/2009 | Wang et al. | 370/218 |
| 2009/0296576 A1 | 12/2009 | Serbest et al. | |
| 2011/0013629 A1 | 1/2011 | Avoy et al. | |
| 2011/0044339 A1 | 2/2011 | Kotalwar et al. | |
| 2011/0051726 A1 | 3/2011 | Bejerano et al. | |
| 2011/0075663 A1 | 3/2011 | Serbest | |

* cited by examiner

*Primary Examiner* — Gary Mui
(74) *Attorney, Agent, or Firm* — Jackson Walker L.L.P.

(57) ABSTRACT

A method and system for multicasting IPTV channels includes using both a designated and a redundant network routing device. When the designated routing device detects that an MCDN network connection to an IPTV multicast source is unavailable, the designated routing device reduces its designation priority to a lower value. A message is sent to the redundant routing device with an instruction to increase its designation priority to a higher value. After the designation priorities have been modified, the designated routing device may serve as a new redundant routing device, while the redundant routing device may serve as a new designated routing device. The routing devices may remain in the new configuration, even after interrupted network connections are restored.

21 Claims, 8 Drawing Sheets

ROBUST MULTICAST BROADCASTING

BACKGROUND

1. Field of the Disclosure

The present disclosure relates to multicasting of Internet-protocol television (IPTV) channels and, more particularly, to robustness of multicast IPTV channels.

2. Description of the Related Art

Multicast IPTV channels may be transmitted over a backbone network using redundant network routers. Common network failures may include the loss of multiple network links. Network reconfiguration after the failure of multiple network links may result in an undesirable network configuration.

DESCRIPTION OF THE EXEMPLARY EMBODIMENTS

Figure 1:
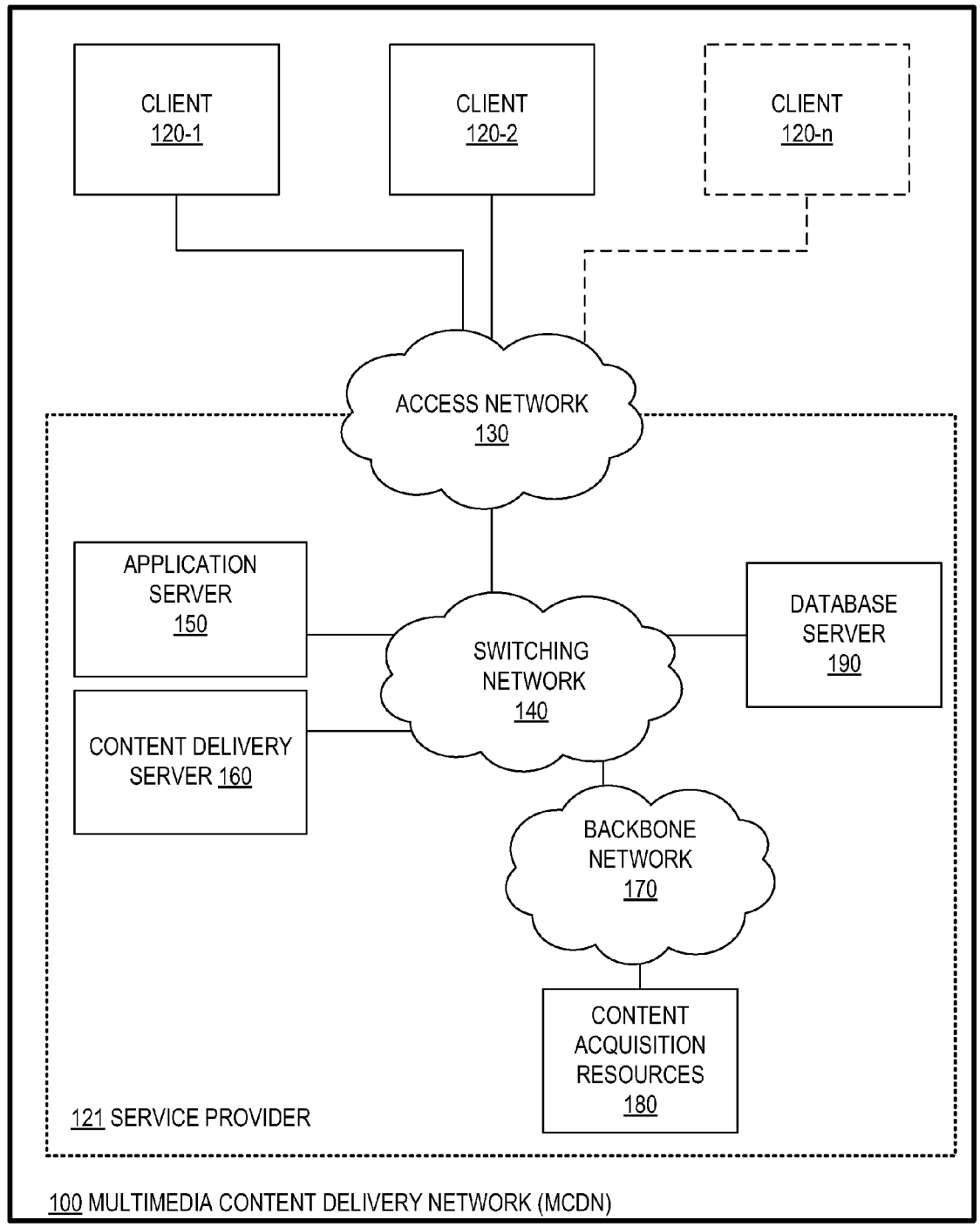
FIG. 1 is a block diagram of selected elements of an embodiment of a multimedia distribution network.

In one aspect, a disclosed method for multicasting IPTV channels over a multimedia content distribution network (MCDN) includes determining that an MCDN network connection to an IPTV multicast source is unavailable to a designated routing device. The determining may include performing a Reverse Path Forwarding (RPF) check. Responsive to the determining, the method may further include reducing a designation priority of the designated routing device, and further include sending, via an MCDN switching network, a message to a redundant routing device, the message requesting the redundant routing device to increase its designation priority.

In specific embodiments, the method may include receiving, via the MCDN switching network, a response from the redundant routing device confirming that the designation priority of the redundant routing device exceeds the designation priority of the designated routing device. The reducing of the designation priority may further be responsive to determining that a direct network connection between the designated routing device and the redundant routing device is unavailable. The MCDN network connection to the IPTV multicast source may include an Internet-protocol (IP) backbone network. The message may substantially conform to a Protocol Independent Multicast (PIM) routing protocol. The redundant routing device may be configured to communicate with the IPTV multicast source and the MCDN switching network.

In particular embodiments, the method also includes sending PIM join messages to a routing device coupled to the IPTV multicast source, and forwarding multimedia content from the IPTV multicast source to a plurality of MCDN clients via the MCDN switching network. As a result of said reducing the designation priority, the designated routing device may stop said sending of PIM join messages and may stop said forwarding of multimedia content, while the method may further include configuring the designated routing device as a new redundant routing device. After said forwarding has stopped, the method may still further include determining that the MCDN network connection to the IPTV multicast source is available to the designated routing device.

In another aspect, a network routing device for multicasting IPTV channels over an MCDN may include a processor, and memory media accessible to the processor, including instructions executable by the processor. The instructions may be executable to increase a designation priority of the network routing device in response to receiving a predetermined message from a designated routing device. Then, the instructions may be executable to send PIM join messages to a last hop routing device coupled to an IPTV multicast source. The instructions may further be executable to forward multimedia content from the IPTV multicast source, via the last hop routing device, to a plurality of MCDN clients via an MCDN switching network. An MCDN network connection to the last hop routing device may include an IP backbone network. The predetermined message may substantially conform to a PIM routing protocol. After said increase of the designation priority, the network device may be configured as a new designated routing device.

In yet another aspect, a disclosed computer-readable memory media includes executable instructions for multicasting IPTV channels over an MCDN. The instructions may be executable to determine that an MCDN connection to an IPTV multicast source is unavailable, reduce a designation priority of the designated routing device from a first value to a second value, and send, via an MCDN switching network, a multicast message to a redundant routing device including a message requesting the redundant routing device to increase a designation priority of the redundant routing device from a third value to a fourth value, while the first value may be greater than the third value and the fourth value may be greater than the second value.

In particular embodiments, the memory media may further include instructions executable to determine that a direct network connection between the designated routing device and the redundant routing device is unavailable. The multicast message may substantially conform to a PIM routing protocol Hello message. The memory media may further include instructions executable to forward multimedia content from the IPTV multicast source to a plurality of MCDN clients via the MCDN switching network before said instructions determine that the MCDN connection is unavailable. As a result of said reducing the designation priority, the designated routing device may stop forwarding multimedia content. The memory media may still further include instructions executable to configure the designated routing device as a new redundant routing device. After said forwarding has stopped, the instructions may be executable to determine that the MCDN network connection to the IPTV multicast source is available. The instructions executable to determine that the MCDN network connection to the IPTV multicast source is unavailable may further include instructions executable to perform an RPF check.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein the terms "multicast" or "multicasting" refer to a form of network addressing for the delivery of data to a group of destinations simultaneously. In IP multicasting, such as an IPTV implementation, multicasting may occur at the IP routing level, where network routing devices create optimal distribution paths, also referred to as "multicast paths", for portions of data, also referred to as "packets" or "datagrams". The distribution paths link sources of multicast data to receivers of multicast data. In an IPTV multicast, a relatively small number of sources may deliver multimedia content, i.e., "IPTV channels", to a relatively large number of receivers, such as MCDN client systems, as will be described in detail below.

In addition, certain network protocols may be used to implement multicasting. In IP multicasting, an IP multicast group address may be used by sources and receivers to send and receive multimedia content. Sources may use the multicast group IP address as a destination address, while receivers may designate that they are interested in receiving data packets sent to that address. A receiver may accomplish this by sending a "join message" to a network routing device to join a multicast group receiving data packets sent to the multicast group IP address. One network protocol used by receivers to join a group is the Internet Group Management Protocol (IGMP), whose join message may be referred to as an "IGMP join message."

Once receivers have joined a multicast group, a multicast path for the group may be established. A common protocol for determining multicast paths from senders to receivers is PIM, which also may involve sending a "PIM join message." Network routing devices may begin forwarding multicast data packets when a join message has been received. Network routing devices may send a join message when they wish to receive multicast packets.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an IP-compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Backbone network 170 may provide multimedia content over large geographic areas, such as between major population centers, or across an entire national network system. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. In certain embodiments, application server 150 may be configured to include various additional software applications (not shown in FIG. 1).

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, and details for network equipment in switching network 140 and/or backbone network 170.

Figure 2:
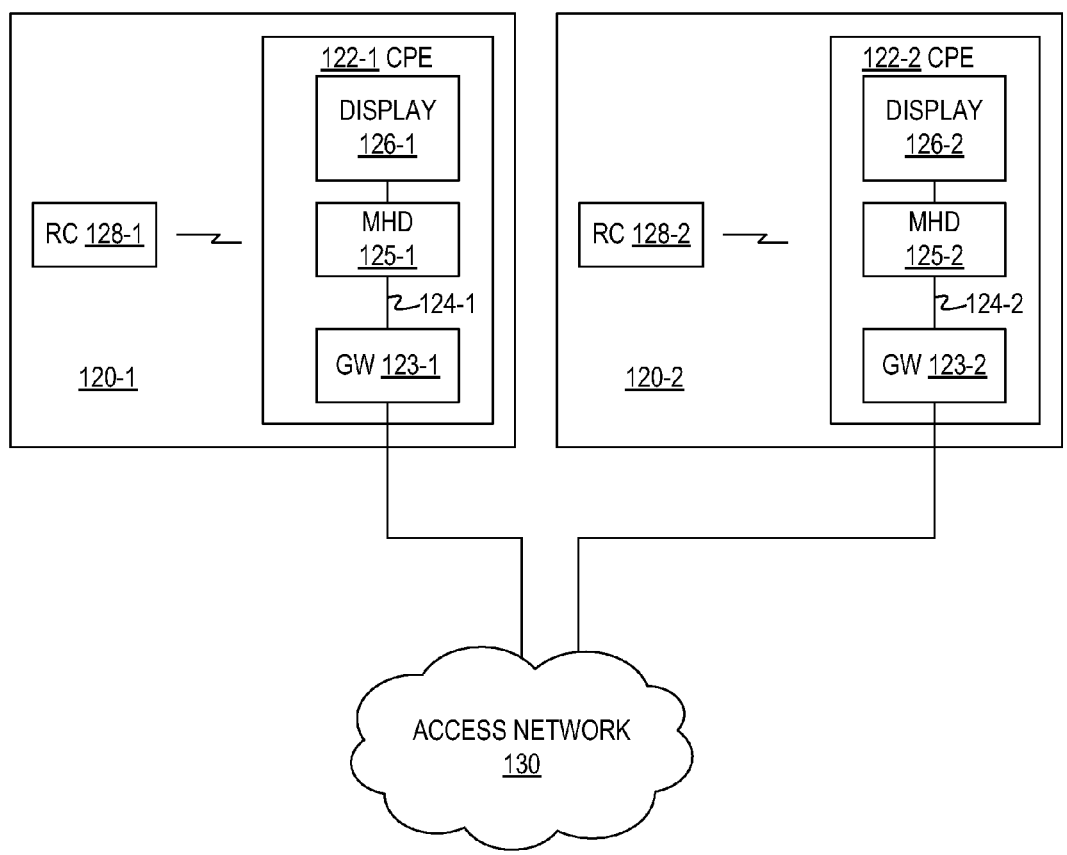
FIG. 2 is a block diagram of selected elements of an embodiment of a multimedia distribution network.

Turning now to FIG. 2, clients 120 are shown in additional detail with respect to access network 130. Clients 120 may include network appliances collectively referred to herein as client premises equipment (CPE) 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125. In some embodiments, remote control 128 may be used to select programs for viewing using MHD 125 and display 126.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a coaxial or IP-based multimedia content delivery network.

Figure 3:
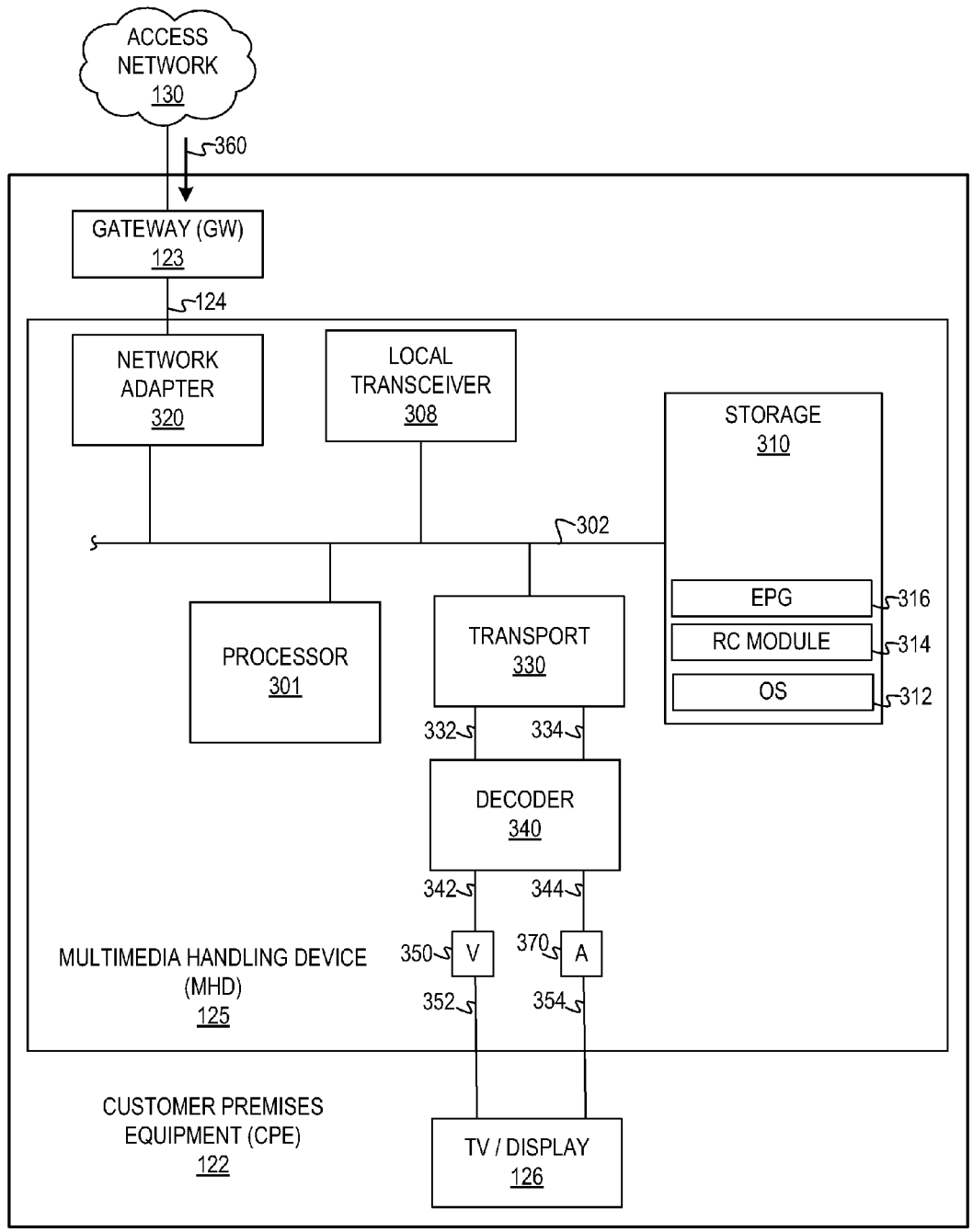
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In coaxial based access networks, content may be delivered as a stream that is not packet based and it may not be necessary in these embodiments to include transport unit 330. In a coaxial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, and EPG 316. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314.

Local transceiver 308 represents an interface of MHD 125 for communicating with external devices, such as remote control 128, or another universal remote control device. Local transceiver 308 may provide a mechanical interface for coupling to an external device, such as a plug, socket, or other proximal adapter. In some cases, local transceiver 308 is a wireless transceiver, configured to send and receive IR or RF or other signals. Local transceiver 308 may be accessed by RC module 314 for providing remote control functionality.

Figure 4:
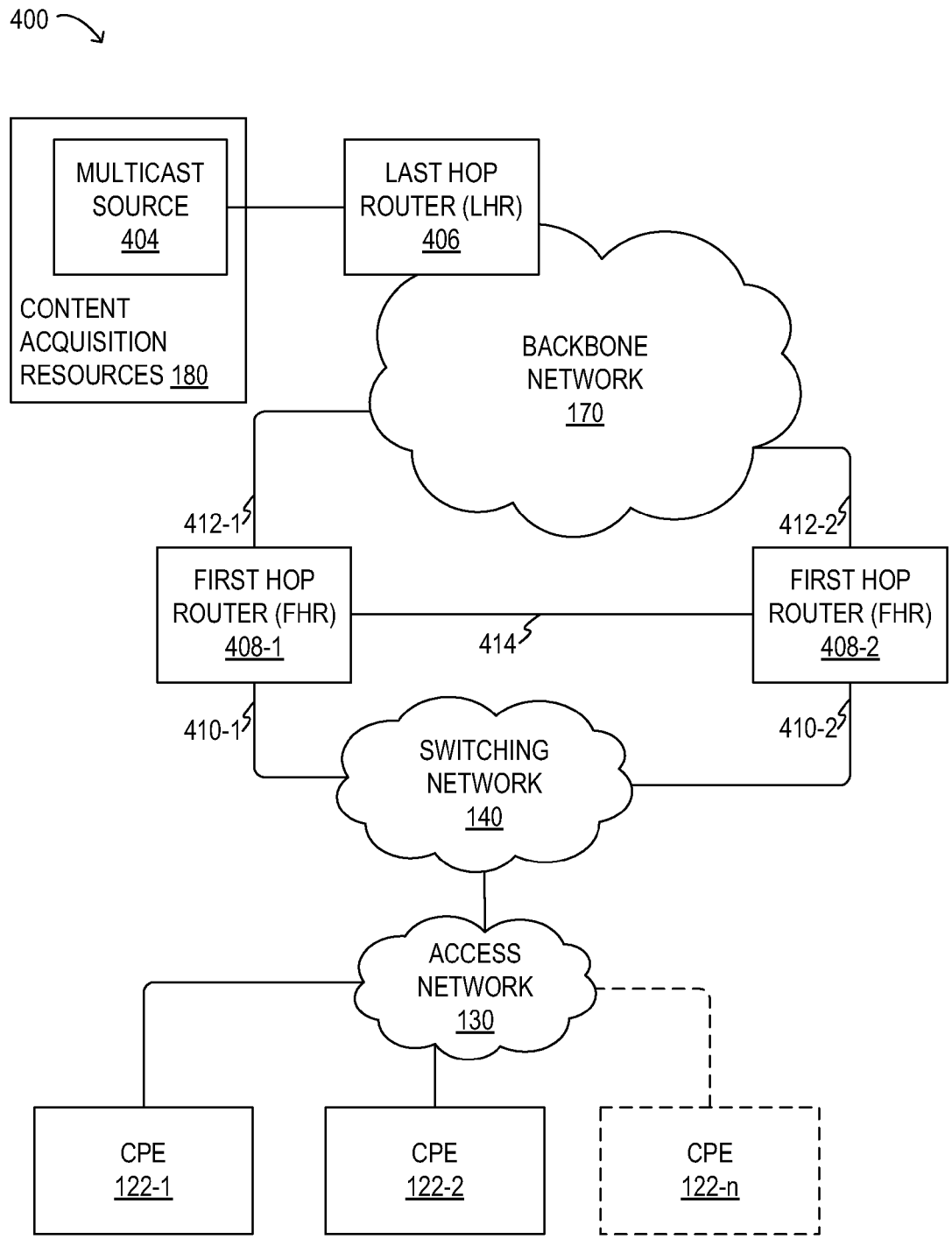
FIG. 4 is a block diagram of selected elements of an embodiment of a multimedia distribution network.

Turning now to FIG. 4, a block diagram of selected elements of an embodiment of MCDN system 400 is depicted. It is noted that like numbered elements in FIG. 4 represent components discussed above with respect to FIGS. 1-3. MCDN system 400 depicts in detail elements that may be configured to multicast IPTV channels originating at multicast source 404 to the multicast receivers, in this case, CPEs 122. Multicast source 404 may represent functionality included in content acquisition resources 180 (see FIG. 1).

In MCDN system 400, CPEs 122 may be coupled to switching network 140 via access network 130 (see also FIG. 1). Upon selection of a viewing channel at a given one of CPEs 122, for example, CPE 122-1, a join message may be forwarded by switching network 140 to first hop router (FHR) 408, indicating that CPE 122-1 desires to join the multicast IP group for the desired channel. In certain embodiments, the join message is an IGMP join message.

Backbone network 170 is depicted in MCDN system 400 including last hop router (LHR) 406, while FHRs 408 are shown coupled to backbone network 170 via network links 412. It is noted that in certain embodiments, both LHR 406 and FHR 408 may be included as elements within backbone network 170, such that network links 412 may represent connections within backbone network 170. In MCDN system 400, network links 412 and FHRs 408 are shown external to backbone network 170 for a clearer description of the methods described herein. LHR 406 and FHR 408 may thus represent the endpoints of multicast paths (not shown in FIG. 4) within backbone network 170 for transmitting IPTV channels from multicast source 404 to switching network 140, and further to CPEs 122. LHR 406 may be directly coupled to multicast source 404 and may continuously receive network traffic, or data packet flow, representing a plurality of IPTV channels, from multicast source 404. LHR 406 may only forward desired IPTV channels once a join message for the desired IPTV channels has been received. For example, FHR 408 may send a PIM join message to LHR 408, after which an IPTV channel transmission may proceed across backbone network 170, and continue with the streaming of desired IPTV channels to CPEs 122.

In the configuration shown in MCDN system 400, FHR 408-1 and FHR 408-2 may represent substantially identical network equipment that is configured for redundancy. For example, FHR 408-1 may be configured as a "designated router" while FHR 408-2 may be configured as a "redundant router" or a "non-designated router". A designated router may be configured with a high designation priority for IPTV data packets and may further be configured to accept IGMP joins and issue PIM joins. A redundant router may be configured with a low designation priority and may be configured to neither accept IGMP joins nor issue PIM joins. As a result of the foregoing, IPTV network traffic may be routed by backbone network 170 to the designated router, while the redundant router may not receive IPTV network traffic.

Also shown in FIG. 4 is redundancy link 414, representing a direct network connection between FHR 408-1 and FHR 408-2. In certain embodiments, redundancy link 414 may be included as a mechanism for FHR 408-1 and FHR 408-2 to communicate with each other, including for the purpose of transferring designated and redundant configurations. For example, in case network link 412-1 becomes unavailable, FHR 408-1 may use redundancy link 414 to notify FHR 408-2 that it should become the designated router and begin forwarding IPTV traffic to CPEs 122. However, in many real-world situations, redundancy link 414 and any of network links 412 may become unavailable simultaneously. Such a failure may cause a designated router to utilize switching network 140 via network links 410 for routing IPTV traffic from backbone network 170, which may, in turn, cause undesired traffic patterns within MCDN system 400. Such undesired traffic patterns may be associated with direct economic losses, poor network performance, and poor utilization of capital invested in network infrastructure.

According to the methods described herein, in case one network link 412 becomes unavailable, FHR 408-1 and FHR 408-2 may communicate via network links 410 across switching network 140. The communication may cause a redundant router to be reconfigured as a new designated router and begin routing IPTV traffic via one available network link 412. Such methods may also be employed when one network link 412 and redundancy link 414 become unavailable simultaneously.

In operation of MCDN system 400, FHR 408-1 may initially be a designated router, while FHR 408-2 may initially be a redundant router. FHR 408-1 may stream IPTV channels from network link 412-1 to network link 410-1. At some point, network link 412-1 may become unavailable. Redundancy link 414 may also become unavailable at the same time. FHR 408-1 may then reduce its designation priority to a lower value. FHR 408-1 may further send a message via switching network 140 to FHR 408-2, instructing FHR 408-2 to raise its designation priority. FHR 408-2 may then raise its designation priority to a higher value, causing network link 412-2 to receive network traffic previously received by network link 412-1. FHR 408-2 may then commence streaming of IPTV channels from network link 412-2 to network link 410-2. FHR 408-1 may then become a new redundant router, while FHR 408-2 may become a new designated router. Both FHR 408-1 and FHR 408-2 may maintain the new configuration, even after network link 412-1 becomes available at some later time. Upon a subsequent interruption of network link 412-2, the above process may be repeated in reverse with respect to FHR 408-1 and FHR 408-2.

Figure 5:
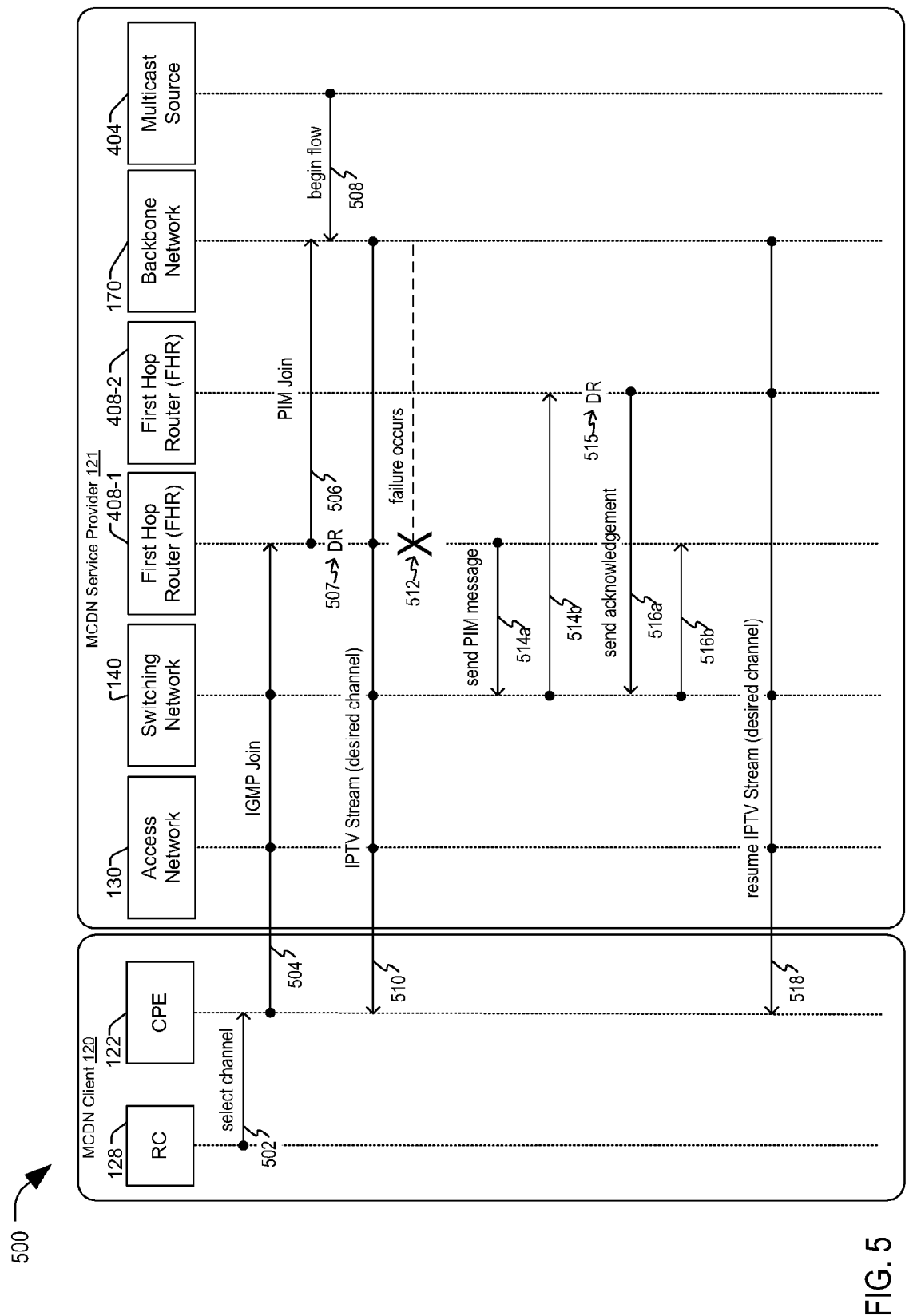
FIG. 5 illustrates an embodiment of a method for multicasting IPTV channels over a multimedia distribution network.

Referring to FIG. 5, a ladder diagram of an embodiment of method 500 for multicasting over an MCDN is shown. It is noted that like numbered elements in FIG. 5 represent components discussed above with respect to FIGS. 1-4. Method 500 includes various operations which are shown in various stages of execution. In method 500, FHR 408-1 may initially be configured as a designated router, while FHR 408-2 may initially be configured as a redundant router.

Remote control 128 may be used to change an IPTV channel (operation 502), or select a desired IPTV channel, in conjunction with CPE 122 at an MCDN client 120. Then, IGMP join 504, reflecting CPE 122 desiring to join a multicast group receiving the desired IPTV channel, may be generated and sent to FHR 408-1. Accordingly, information indicative of IGMP join 504 may be forwarded from MCDN client 120 to MCDN service provider 121. In particular, IGMP join 504 may be transmitted via access network 130 and switching network 140 (see also FIG. 1) to FHR 408-1. It is noted that while a single MCDN client is shown in FIG. 5, method 500 may be applicable to a large number of MCDN clients 120 sending respective IGMP joins 504 to MCDN service provider 121.

FHR 408-1, in its role as designated router 507, may then issue PIM join 506 to LHR 406 (not shown in FIG. 5) represented by back bone network 170 in FIG. 5, specifying a number of multicast paths across backbone network 170. It is noted that backbone network 170 may be in reception of continuous flow 508 of IPTV channels from multicast source 404. After receiving PIM join 506, backbone network 170 may begin transmitting a plurality of IPTV channels, including the desired IPTV channel. The transmission results in the IPTV channels arriving at FHR 408-1. FHR 408-1 may then forward IPTV Stream 510, including the desired IPTV channel, to CPE 122.

At some point during forwarding of IPTV Stream 510, failure 512 may occur. Failure 512 may be a hardware, software, or a configuration failure, or may be the result of damaged network connections. Failure 512 results in the network connection between FHR 408-1 and backbone network 170 becoming unavailable, thereby interrupting IPTV Stream 510. Despite failure 512, FHR 408-1 may send PIM message 514a to switching network 140, which may in turn, forward PIM message 514b to FHR 408-2. PIM message 514a-b may be a PIM Hello message with a private parameter indicating that FHR 408-2 should increase its designation priority and assume the role of designated router 515. Prior to, or simultaneous with, sending PIM message 514a, FHR 408-1 may reduce its own designation priority to a lower value (not shown in FIG. 5). FHR 408-2 may then send acknowledgement 516a to switching network 140, which may in turn, forward acknowledgement 516b to FHR 408-1. Receipt of acknowledgement at FHR 408-1 may signal, or confirm, that FHR 408-1 is the new redundant router, while FHR 408-2 is the new designated router 515. In certain embodiments, acknowledgement 516a-b may be a PIM message. After a new designated router 515 is established, backbone network 170 may resume transmitting a plurality of IPTV channels, including the desired IPTV channel. The transmission results in the IPTV channels now arriving at FHR 408-2. FHR 408-2 may then forward IPTV Stream 518, including the desired IPTV channel, to CPE 122. FHR 408-2 may remain the designated router 515 even after failure 512 has been remediated and/or FHR 408-1 can again communicate with backbone network 170 at some later time.

Figure 6:
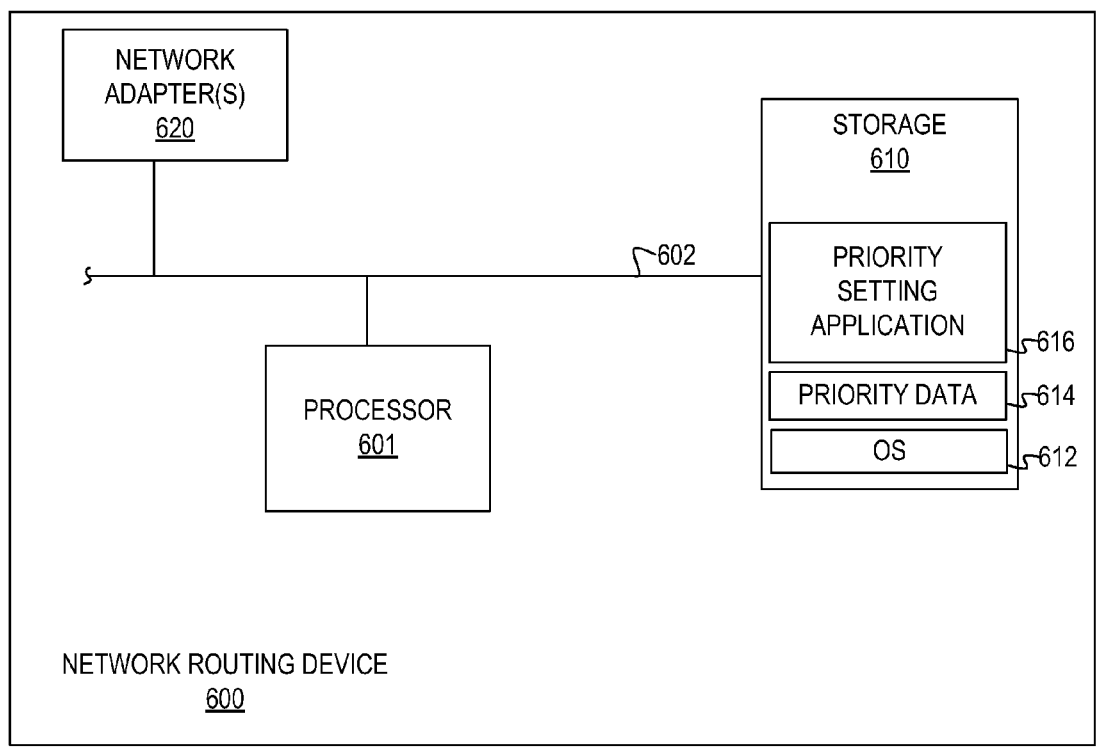
FIG. 6 is a block diagram of selected elements of an embodiment of a network routing device.

Referring now to FIG. 6, a block diagram illustrating selected elements of an embodiment of network routing device 600 is presented. In FIG. 6, network routing device 600 is shown schematically, independent of any physical implementation or packaging.

In the embodiment depicted in FIG. 6, network routing device 600 includes processor 601 coupled via shared bus 602 to storage media collectively identified as storage 610. Network routing device 600, as depicted in FIG. 6, further includes network adapter(s) 620 that may interface, or interconnect a number of network ports. In certain embodiments, network routing device 600 may include functionality for switching logical network connections among a number of network ports, which may be represented by network adapter(s) 620. Accordingly, shared bus 602 may represent a switch fabric or interconnect, suitable for routing and switching a number of network connections simultaneously.

Storage 610 encompasses persistent and volatile media, fixed and removable media, and magnetic and semiconductor media. Storage 610 is operable to store instructions, data, or both. Storage 610 as shown may include sets or sequences of instructions, namely, an operating system 612, priority data 614, and priority setting application 616. Priority data 614 may include data indicative of a redundancy priority of network routing device 600. Operating system 612 may be a UNIX or UNIX-like operating system, a Windows® family operating system, an embedded operating system, or another suitable operating system. In some embodiments, priority setting application 616 represents executable instructions for transferring redundancy priority during multicasting of IPTV channels, as described herein.

Figure 7:
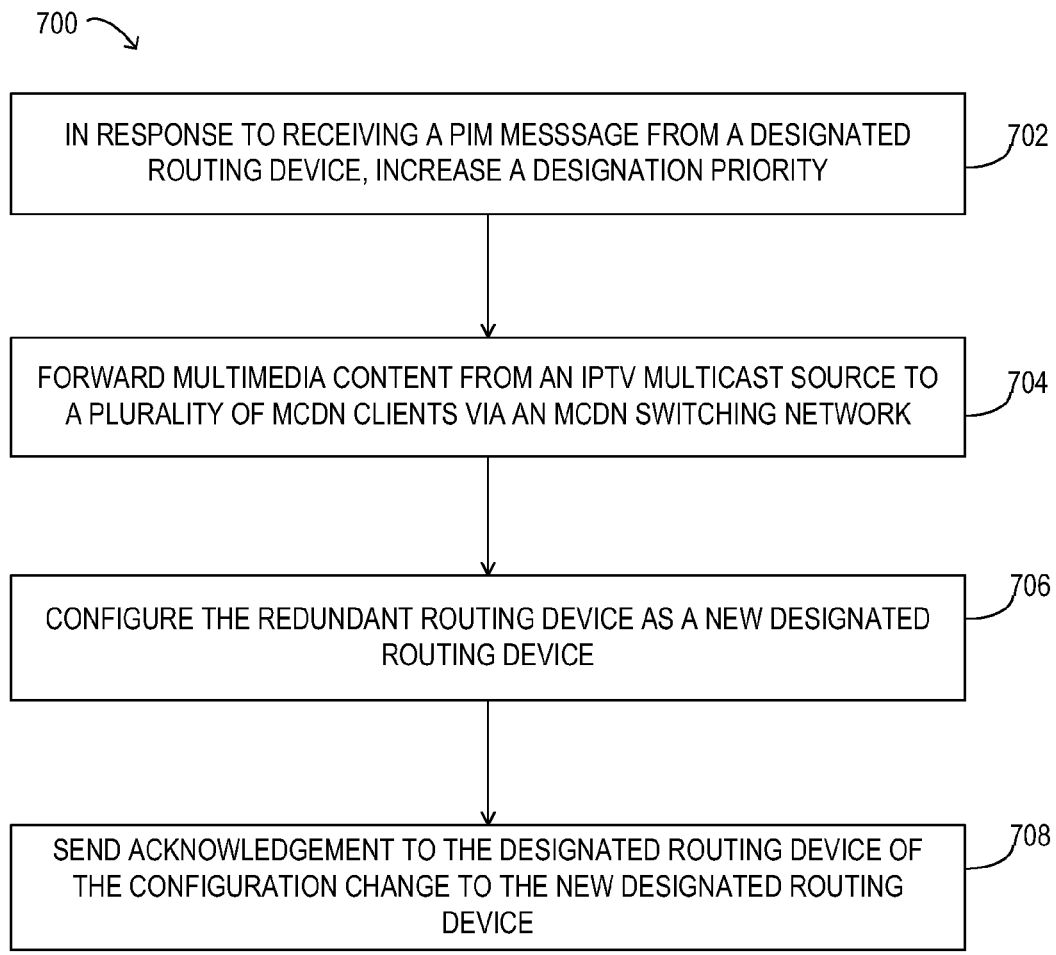
FIG. 7 illustrates an embodiment of a method for multicasting IPTV channels over a multimedia distribution network.

Turning now to FIG. 7, an embodiment of method 700 for transferring redundancy priority during multicasting of IPTV channels is illustrated. Method 700 may be executed by a redundant routing device, as described above. It is noted that certain operations in method 700 may be rearranged or omitted in various embodiments.

In response to receiving a PIM message from a designated routing device, a designation priority may be increased (operation 702). The designation priority may be increased to the highest value for any available routing devices. The increase in designation priority may result in multimedia content, such as IPTV channels, being received from an IPTV multicast source. The multimedia content may be forwarded from an IPTV multicast source to a plurality of MCDN clients via an MCDN switching network (operation 704). The redundant routing device may be configured as a new designated routing device (operation 706). An acknowledgement may be sent to the designated routing device of the configuration change to the new designated routing device (operation 708).

Figure 8:
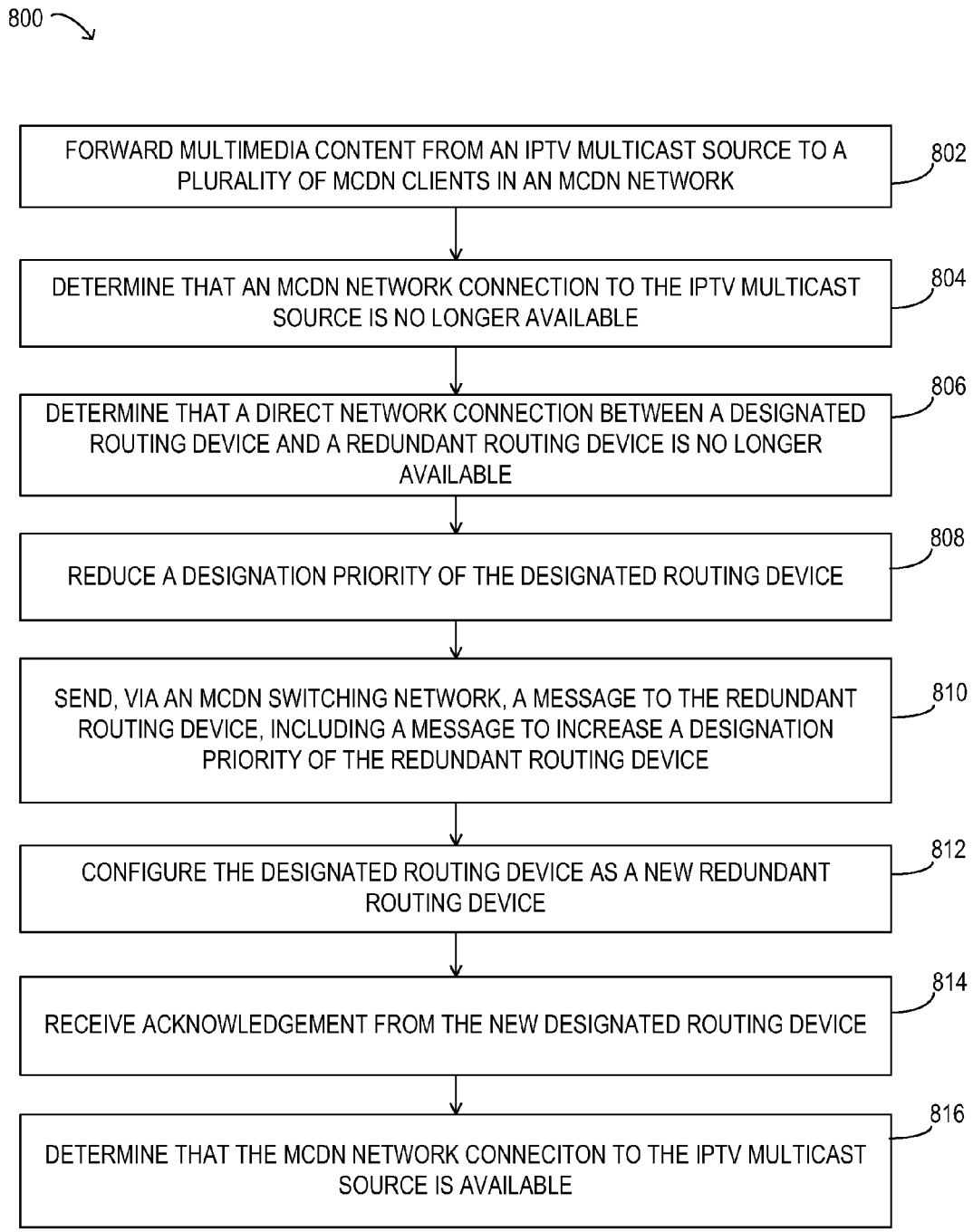
FIG. 8 illustrates an embodiment of a method for multicasting IPTV channels over a multimedia distribution network.

Turning now to FIG. 8, an embodiment of method 800 for transferring redundancy priority during multicasting of IPTV channels is illustrated. Method 800 may be executed by a designated routing device, as described above. It is noted that certain operations in method 800 may be rearranged or omitted in various embodiments.

Multimedia content may be forwarded from an IPTV multicast source to a plurality of MCDN clients in an MDCN network (operation 802). The multimedia content may include IPTV channels, while the MCDN clients may be accessible via an MCDN switching network. An MCDN network connection to the IPTV multicast source may be determined to be no longer available (operation 804). A direct network connection between the designated routing device and a redundant routing device may be determined to be no longer available (operation 806). The determination in operation 806 may include performing an RPF check from an LHR to a FHR over a backbone network. A designation priority of the designated routing device may be reduced (operation 808). The designation priority may be reduced to a minimum value for all available routing devices. Via the MCDN switching network, a message may be sent to the redundant routing device, including a message to increase a designation priority of the redundant routing device (operation 810). The message may be a PIM Hello message. The designated routing device may be configured as a new redundant routing device (operation 812). An acknowledgement may be received from the new designated routing device (operation 814). The MCDN network connection to the IPTV multicast source may be determined to be available (operation 816). After operation 816, the new redundant routing device configuration may remain unchanged.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for multicasting multimedia content over a network, the method comprising:
   first determining, by a designated routing device, that a distribution network connection to a multicast source is unavailable to the designated routing device;
   second determining that a direct connection between the designated routing device and a redundant routing device is unavailable;
   responsive to the first determining and the second determining, reducing a designation priority of the designated routing device; and
   sending, via a switching network connection, a message to the redundant routing device, the message requesting the redundant routing device to increase its designation priority;
   wherein the direct connection is a redundancy link for transferring designated and redundancy configuration information between the designated routing device and the redundant routing device.

2. The method of claim 1, further comprising:
   receiving, via the switching network connection, a response from the redundant routing device confirming that the designation priority of the redundant routing device exceeds the designation priority of the designated routing device.

3. The method of claim 1, wherein the distribution network connection to the multicast source of multimedia content includes an Internet-protocol backbone network.

4. The method of claim 1, wherein the message substantially conforms to a protocol independent multicast routing protocol.

5. The method of claim 1, wherein the redundant routing device communicates with the multicast source of multimedia content and a switching network.

6. The method of claim 1, further comprising:
   forwarding multimedia content from the multicast source of multimedia content to a plurality of clients via the switching network.

7. The method of claim 6, further comprising:
   configuring the designated routing device as a new redundant routing device.

8. The method of claim 7, further comprising:
   subsequently determining that the distribution network connection to the multicast source of multimedia content is available to the designated routing device.

9. The method of claim 1, wherein the first determining includes performing a reverse path forwarding check.

10. The method of claim 1, wherein the switching network includes a digital subscriber line access multiplexer.

11. A network routing device for multicasting Internet-protocol television channels over a distribution network, comprising:
    a processor; and
    memory media accessible to the processor, storing a program of processor instructions executable by the processor, which when executed by the processor, performs a method to:
    increase a designation priority of the network routing device in response to receiving a predetermined message from a designated routing device and determining that a direct connection to the designated routing device is unavailable;
    after increasing the designation priority, send protocol independent multicast join messages to a last hop routing device coupled to a multicast source of multimedia content; and
    after said protocol independent multicast join messages are sent, forward multimedia content from the multicast source, via the last hop routing device, to a plurality of distribution network clients via a multimedia content distribution network switching network;
    wherein the direct connection is a redundancy link for transferring designated and redundancy configuration information between the network routing device and the designated routing device.

12. The network device of claim 11, wherein a distribution network connection to the last hop routing device includes an Internet-protocol backbone network.

13. The network device of claim 11, wherein the predetermined message substantially conforms to a protocol independent multicast routing protocol.

14. The network device of claim 11, wherein after said increase of the designation priority, the network device is configured as a new designated routing device.

15. The network routing device of claim 11, wherein the switching network includes a digital subscriber line access multiplexer.

16. A non-transitory computer-readable medium storing instructions, executable by a processor, for multicasting Internet-protocol television channels over a distribution network, said instructions, when executed by the processor perform a method for:
- first determining that a distribution network connection to a multicast source of multimedia content is unavailable;
- second determining that a direct connection between a designated routing device and a redundant routing device is unavailable;
- reducing a designation priority of the designated routing device from a first value to a second value; and
- sending, via a multimedia content distribution network switching network, a multicast message to the redundant routing device including a message requesting the redundant routing device to increase a designation priority of the redundant routing device from a third value to a fourth value, wherein the first value is greater than the third value and the fourth value is greater than the second value;
- wherein the direct connection is a redundancy link for transferring designated and redundancy configuration information between the designated routing device and the redundant routing device.

17. The computer readable medium of claim 16, wherein the multicast message substantially conforms to a protocol independent multicast routing protocol hello message.

18. The computer readable medium of claim 16, wherein the method includes:
- forwarding multimedia content from the Internet-protocol television multicast source to a plurality of distribution network clients via the distribution network switching network before said instructions determine that the distribution network connection is unavailable.

19. The computer readable medium of claim 18, wherein as a result of said reducing the designation priority, the designated routing device stops forwarding multimedia content, and wherein the method includes:
- configuring the designated routing device as a new redundant routing device.

20. The computer readable medium of claim 19, wherein the method includes:
- after said forwarding has stopped, determining that the distribution network connection to the Internet-protocol television multicast source is available.

21. The computer readable medium of claim 16, wherein determining that the distribution network connection to the Internet-protocol television multicast source is unavailable includes:
- performing a reverse path forwarding check.

* * * * *